United States Patent
Lee et al.

(10) Patent No.: US 9,477,045 B2
(45) Date of Patent: Oct. 25, 2016

(54) OPTICAL ELEMENT USING MULTICORE OPTICAL FIBER GRATING AND METHOD FOR PROCESSING OPTICAL SIGNAL USING THE SAME

(71) Applicant: KOREA INSTITUTE OF SCIENCE AND TECHNOLOGY, Seoul (KR)

(72) Inventors: Sang Bae Lee, Seoul (KR); Kwan Il Lee, Seoul (KR); Kyung Shik Lee, Suwon-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 378 days.

(21) Appl. No.: 14/041,860

(22) Filed: Sep. 30, 2013

(65) Prior Publication Data

US 2014/0308005 A1    Oct. 16, 2014

(30) Foreign Application Priority Data

Apr. 15, 2013 (KR) .................. 10-2013-0040991

(51) Int. Cl.
  G02B 6/34    (2006.01)
  G02B 6/293    (2006.01)
  G02B 6/02    (2006.01)

(52) U.S. Cl.
  CPC ....... G02B 6/29334 (2013.01); G02B 6/02042 (2013.01)

(58) Field of Classification Search
  None
  See application file for complete search history.

(56) References Cited

U.S. PATENT DOCUMENTS

| 5,144,690 A * | 9/1992 | Domash ............. | G01D 5/35383 385/12 |
| 2002/0146226 A1 * | 10/2002 | Davis ................. | G02B 6/02042 385/126 |
| 2007/0286561 A1 | 12/2007 | Poland et al. | |
| 2009/0207483 A1 * | 8/2009 | Goto .................. | G02B 6/02347 359/341.1 |

FOREIGN PATENT DOCUMENTS

| EP | 0 435 194 A2 | 7/1991 |
| JP | 2006-285234 A | 10/2006 |
| KR | 10-2001-0082401 | 8/2001 |
| KR | 10-2003-0089085 | 11/2003 |
| KR | 10-2004-0026766 | 4/2004 |
| KR | 10-2008-0044070 | 5/2008 |

OTHER PUBLICATIONS

Kurkov, A. S., et al. "New mechanism of the mode coupling in multi-core fiber lasers." Fiber Lasers V: Technology, Systems, and Applications, vol. 6873, pp. 68731Q-1-68731Q-9, 2008.

* cited by examiner

*Primary Examiner* — Uyen Chau N Le
*Assistant Examiner* — Chad Smith
(74) *Attorney, Agent, or Firm* — NSIP Law (57) ABSTRACT

An optical element includes a multicore optical fiber, the multicore optical fiber including an inner core and at least one peripheral core arranged around the inner core and having an effective refractive index different from that of the inner core, and an optical fiber grating formed at the multicore optical fiber to cause an optical signal to be coupled between different cores among the inner core and the at least one peripheral core. The optical element allows a signal of a specific wavelength to be dropped added from an optical signal. Since the optical element may be fabricated easily, designed in a small size and mass-produced reproducibly at low costs, the optical element may be advantageously utilized for an optical communication network such as a wavelength division multiplexing network, an ultra-high speed optical communication system, an optical sensor system or the like.

12 Claims, 13 Drawing Sheets

OPTICAL ELEMENT USING MULTICORE OPTICAL FIBER GRATING AND METHOD FOR PROCESSING OPTICAL SIGNAL USING THE SAME

CROSS-REFERENCE TO RELATED APPLICATION

This application claims priority to Korean Patent Application No. 10-2013-0040991, filed on Apr. 15, 2013, and all the benefits accruing therefrom under 35 U.S.C. §119, the contents of which in its entirety are herein incorporated by reference.

BACKGROUND

1. Field

Embodiments relate to an optical element using a multicore optical fiber grating and a method for processing an optical signal using the same.

2. Description of the Related Art

A multicore optical fiber is an optical fiber including several cores and a cladding surround the cores. The multicore optical fiber may be widely used in various fields including, for example, a passive element for implementing an optical communication network, an optical sensor, an optical spatial division multiplexer, a wavelength multiplexer or a wavelength demultiplexer of an optical communication system, or the like.

Figure 1:
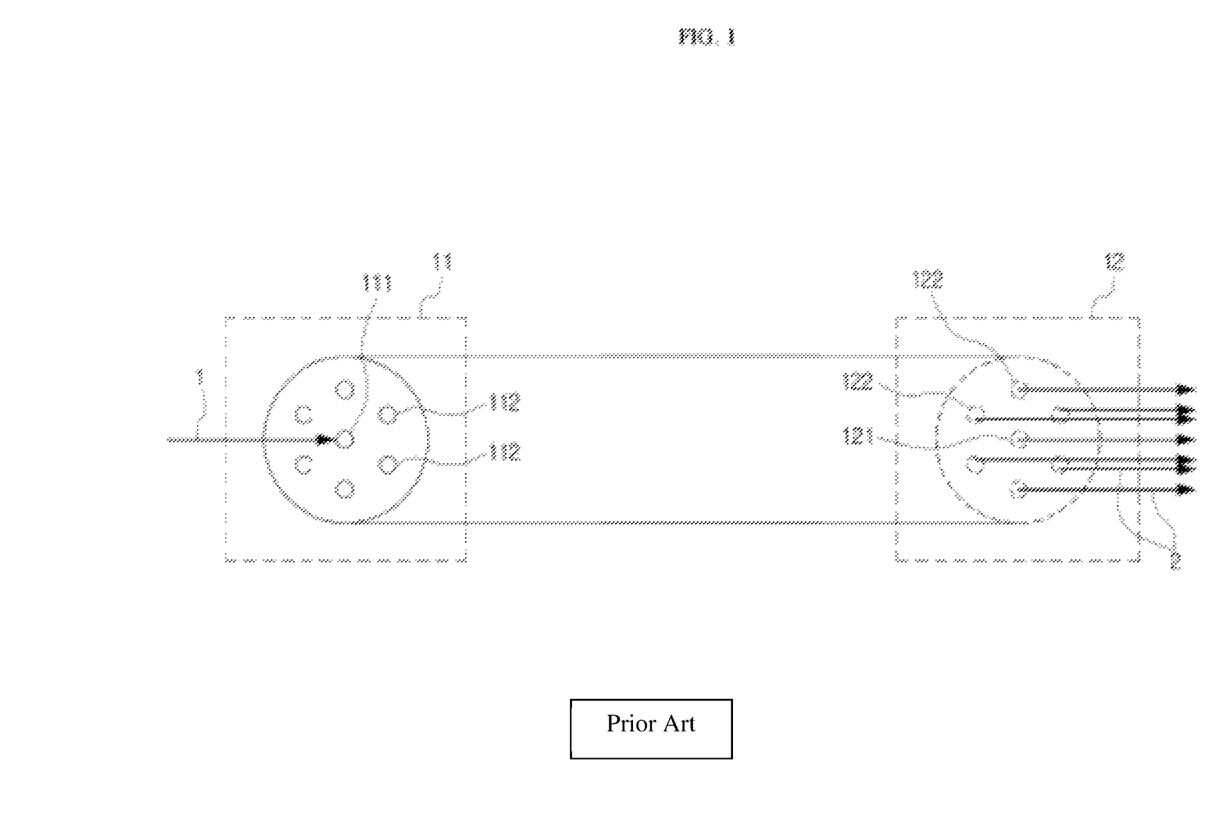
FIG. 1 is a schematic view showing a conventional multicore optical fiber.

FIG. 1 is a schematic view showing a conventional multicore optical fiber. Referring to FIG. 1, the multicore optical fiber may include an input end 11 and an output end 12 while extending in one direction. Regarding the input end 11, the multicore optical fiber may include an inner core 111 located at or near the center of an optical fiber, and at least one peripheral core 112 arranged around the inner core 111. An inner core 121 and at least one peripheral core 122 depicted at the output end 12 respectively correspond to the inner core 111 and at least one peripheral core 112 of the input end 11. For example, the inner core 111 at the input end 11 and the inner core 121 at the output end 21 may designate sections of a single core in different directions.

As shown in FIG. 1, in the conventional multicore optical fiber, the diameter of the inner core 111, 121 is identical to the diameter of the peripheral core 112, 122. In addition, the refractive index of the inner core 111, 121 is also identical to the refractive index of the peripheral core 112, 122. Therefore, if cores sufficiently approach each other in the multicore optical fiber, optical coupling between propagation modes may occur among the cores at substantially all wavelengths. In other words, optical signals of all wavelength bands, incident to the inner core 111, may be coupled with neighboring peripheral cores 112. As a result, an incident light 1 incident to the inner core 111 at the input end 11 is coupled with neighboring cores in the multicore optical fiber and outputs in a form of an output light 2 at the output end 11 through the inner core 121 and at least one peripheral core 122.

Therefore, if an optical element is implemented using a conventional multicore optical fiber configured described above, it is difficult to make an optical element which allows a specific wavelength channel to be dropped or added. An add-drop filter based on a Mach-Zehnder interferometer may be used to drop or add a wavelength channel, which however has problems such as low stability, large product volume and difficult fabrication.

SUMMARY

An aspect of the present disclosure is directed to providing an optical element capable of dropping or adding an optical signal of a specific wavelength channel by using a multicore optical fiber and an optical fiber grating, and a method for processing an optical signal using the same.

According to an embodiment, there is provided an optical element, which includes: a multicore optical fiber including an inner core and at least one peripheral core arranged around the inner core and having an effective refractive index different from that of the inner core; and an optical fiber grating formed at the multicore optical fiber to cause an optical signal to be coupled between different cores among the inner core and the at least one peripheral core.

According to an embodiment, there is provided a method for processing an optical signal, which includes: inputting an optical signal to a multicore optical fiber including an inner core and at least one peripheral core arranged around the inner core and having an effective refractive index different from that of the inner core; and coupling the optical signal between different cores among the inner core and the at least one peripheral core by means of an optical fiber grating formed at the multicore optical fiber.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, embodiments of the present disclosure will be described in detail with reference to the drawings.

An optical element according to embodiments is a device having an optical fiber grating formed at a multicore optical fiber so that an optical signal may be coupled from at least one core to at least one other core at a resonance wavelength. A multicore optical fiber used in the optical element is different from conventional multicore optical fibers in that not all cores are identically configured.

Figure 2A:
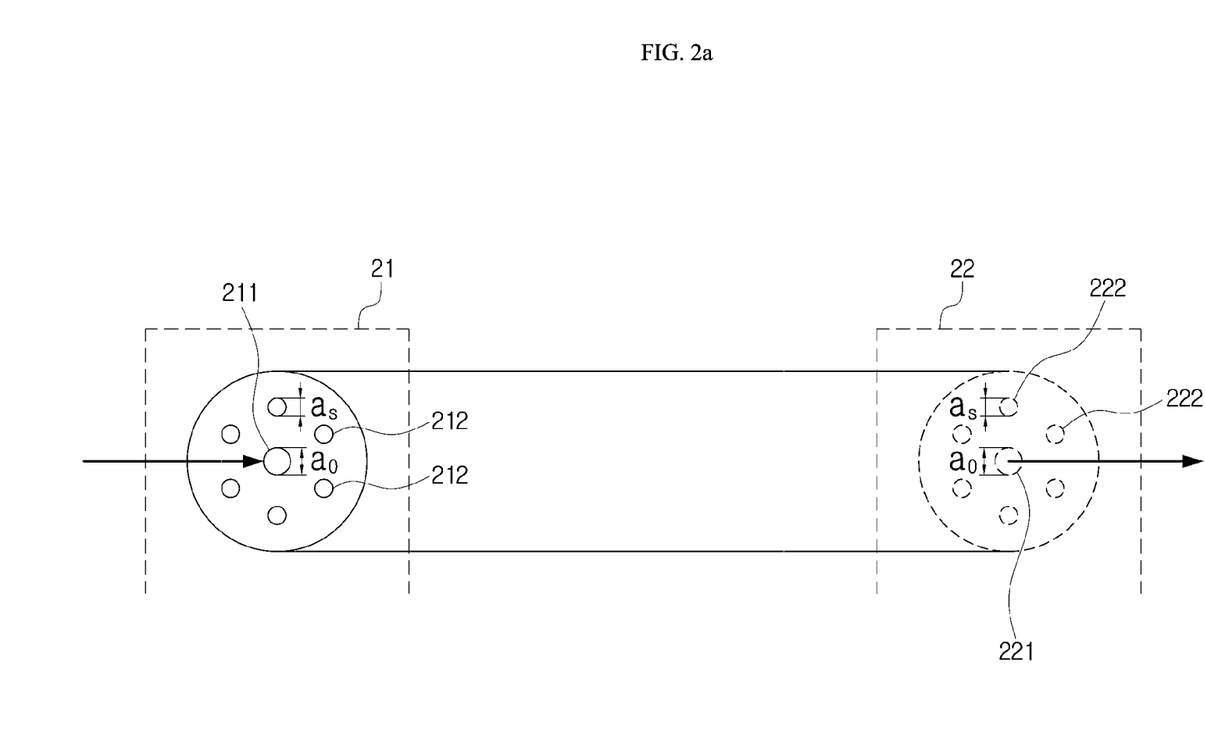
FIGS. 2a and 2b are schematic views showing a multicore optical fiber used for an optical element according to embodiments.

FIG. 2a is a schematic view showing a multicore optical fiber used for the optical element according to the embodiment.

Referring to FIG. 2a, the multicore optical fiber may include an input end 21 and an output end 22 and extend in one direction. Regarding the input end 21, the multicore optical fiber may include an inner core 211 located at or near the center of the optical fiber, and at least one peripheral core 212 arranged around the inner core 211. An inner core 221 and at least one peripheral core 222 depicted at the output end 22 respectively correspond to the inner core 211 and at least one peripheral core 212 of the input end 21. For example, the inner core 211 of the input end 21 and the inner core 221 of the output end 22 may designate cross sections of a single core in different directions.

In the multicore optical fiber shown in FIG. 2a, the diameter $a_0$ of the inner core 211 is different from the diameter $a_s$ of the peripheral core 212. For example, the diameter $a_0$ of the inner core 211 may be greater than the diameter $a_s$ of the peripheral core 212. Similar to the input end 21, in the output end 22, the diameter $a_0$ of the inner core 222 is different from the diameter $a_s$ of the peripheral core 222. For example, the diameter $a_0$ of the inner core 221 may be greater than the diameter $a_s$ of the peripheral core 222. Meanwhile, the refractive index $n_0$ of the inner core 211, 221 may be identical to the refractive index $n_s$ of the peripheral core 221, 222. In the multicore optical fiber configured as above, the propagation mode of the optical signal through the inner core 211, 221 becomes different from the propagation mode of the optical signal through the peripheral core 221, 222. Therefore, a fundamental core mode ($LP_{01}$) transmitted through the inner core 211, 221 is not coupled with the peripheral core 221, 222 at all wavelengths.

Figure 2B:
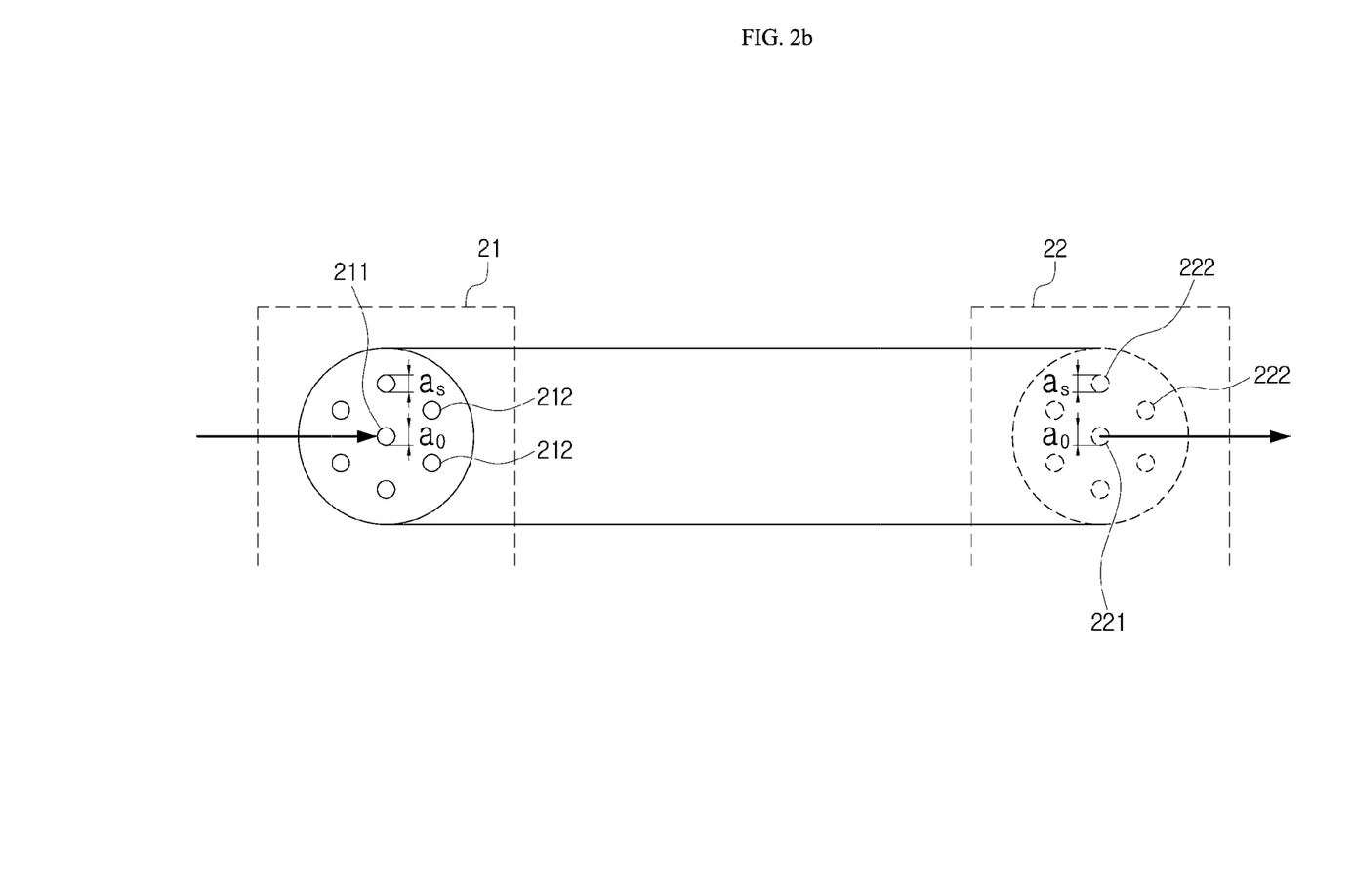

FIG. 2b is a schematic view showing a multicore optical fiber used for an optical element according to another embodiment.

In the multicore optical fiber shown in FIG. 2b, instead of differentiating the diameter $a_0$ of the inner core 211, 221 from the diameter $a_s$ of the peripheral core 221, 222 as shown in the multicore optical fiber of FIG. 2a, the refractive index $n_0$ of the inner core 211, 221 is designed to be different from the refractive index $n_s$ of the peripheral core 221, 222, so that the propagation mode of the optical signal through the inner core 211, 221 becomes different from the propagation mode of the optical signal through the peripheral core 221, 222. Therefore, in the multicore optical fiber depicted in FIG. 2b, the diameter $a_0$ of the inner core 211, 221 may be identical to the diameter $a_s$ of the peripheral core 221, 222.

As shown in FIGS. 2a and 2b, the multicore optical fiber used for the optical element according to the embodiments is configured so that the diameter and/or refractive index of the peripheral core is different from the diameter and/or refractive index of the inner core. As a result, an optical signal coupled with a specific core of the multicore optical fiber is not coupled with another neighboring core, and the optical signal is transferred through only the core to which the optical signal has been incident. At this time, in the embodiments, by forming an optical fiber grating at the multicore optical fiber, a light having a specific wavelength or a wavelength adjacent thereto may be coupled between different cores. A specific wavelength at which mode coupling occurs may be determined based on effective refractive index of the cores where coupling occurs and a period of the optical fiber grating.

In a seven-core optical fiber having seven cores, for example, the inner core has a diameter and/or refractive index different from that of six neighboring cores. Therefore, the optical signal of a fundamental core mode $LP_{01}$ transmitted through the inner core is not coupled with six neighboring cores at all undesired wavelengths. However, in the case an optical fiber grating is formed at the inner core according to embodiments, it is possible that the optical signal is coupled near a resonance wavelength $\lambda_p$ at which phase matching occurs between a propagation mode in which the optical signal is transmitted to the inner core and a propagation mode in which the optical signal is transmitted to a peripheral core. According to the mode coupling theory using an optical fiber grating, a resonance wavelength $\lambda_p$ at which the maximum coupling occurs between two modes may be expressed as follows.

$$\lambda_p = (n_{\text{eff1}} \pm n_{\text{eff2}}) \Lambda \qquad \text{Equation 1}$$

In Equation 1, $n_{\text{eff1}}$ and $n_{\text{eff2}}$ respectively represent effective refractive indexes of two cores at which coupling occurs, and $\Lambda$ represents a period of the optical fiber grating. In Equation 1, the case where a symbol between $n_{\text{eff1}}$ and $n_{\text{eff2}}$ is + corresponds to a case where the optical fiber grating is a reflection-type optical fiber grating, and the case where a symbol between $n_{\text{eff1}}$ and $n_{\text{eff2}}$ is − corresponds to a case where the optical fiber grating is a transmission-type optical fiber grating.

Since the transmission-type optical fiber grating generally has a longer period in comparison to the reflection-type optical fiber grating, the reflection-type optical fiber grating is also called a short period grating (SPG), and the transmission-type optical fiber grating is also called a long period grating (LPG). For example, the long period grating (LPG) may have a period of several micrometers (μm) to several hundred micrometers, and the short period grating (SPG) may have a period of several nanometers (nm) or less than one nanometer, without being limited thereto.

As described above with reference to FIGS. 2a and 2b, in the multicore optical fiber used for the optical element according the embodiments, the diameter and/or refractive index of the inner core is different from the diameter and/or refractive index of the peripheral core. As a result, the effective refractive index of the inner core is different from the effective refractive index of the peripheral core. In this case, mode coupling may occur to the maximum between cores only at the resonance wavelength $\lambda_p$ calculated by Equation 1.

Figure 3A:
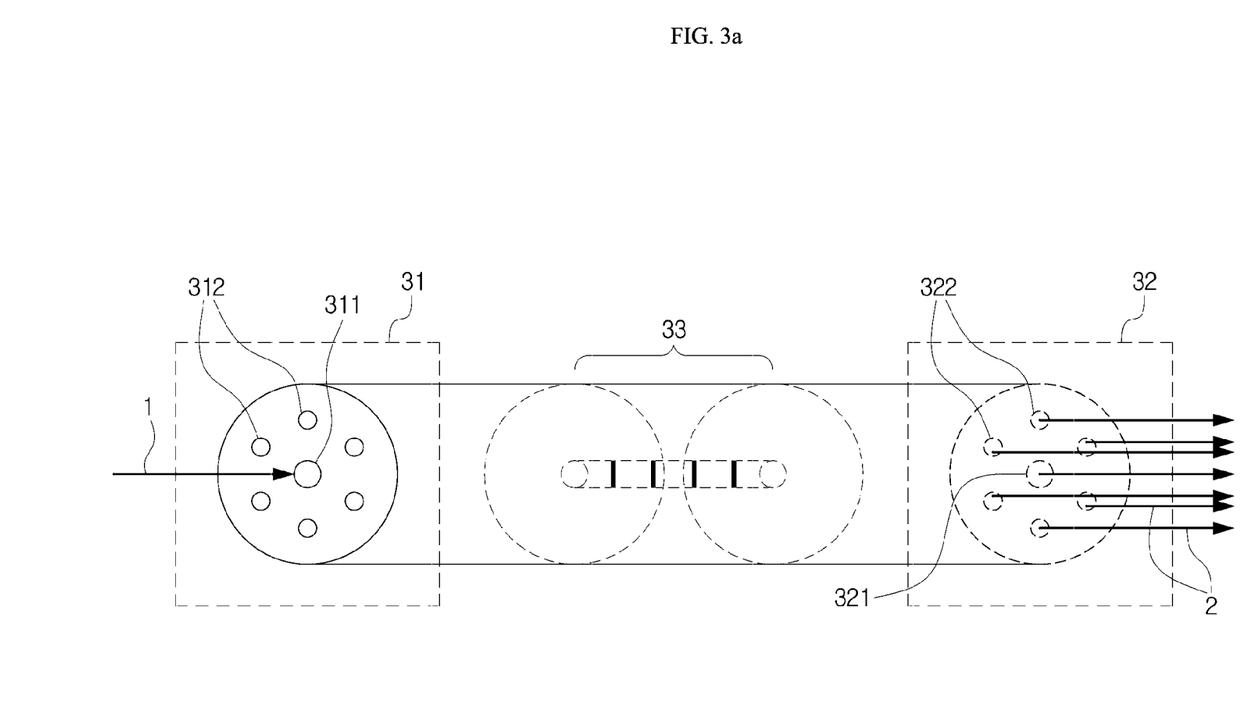
FIGS. 3a and 3b are schematic views showing optical elements according to embodiments.

FIG. 3a is a schematic view showing an optical element according to an embodiment. The optical element shown in FIG. 3a includes the multicore optical fiber described above with reference to FIG. 2a and further includes an optical fiber grating 33 formed at an inner core 311 of the multicore optical fiber.

In this embodiment, the optical fiber grating 33 may be a long period grating (LPG). Among optical signals 1 incident to the inner core 311 through an input end 31 of the multicore optical fiber, the optical signal of a resonance wavelength determined by Equation 1 may be coupled with a peripheral core 312 from the core 311 in a forward direction in a region where the optical fiber grating 33 is located. The wavelength at which such coupling occurs is determined based on effective refractive indexes of the inner core 311 and the corresponding peripheral core 312 and a period of the optical fiber grating 33. Herein, the forward direction means that optical coupling is performed while maintaining the propagation direction before the coupling of the optical signal 1. As a result of such coupling, at the output end 32 of the multicore optical fiber, an output light 2 may be output through the inner core 321 and at least one peripheral core 322.

Figure 3B:
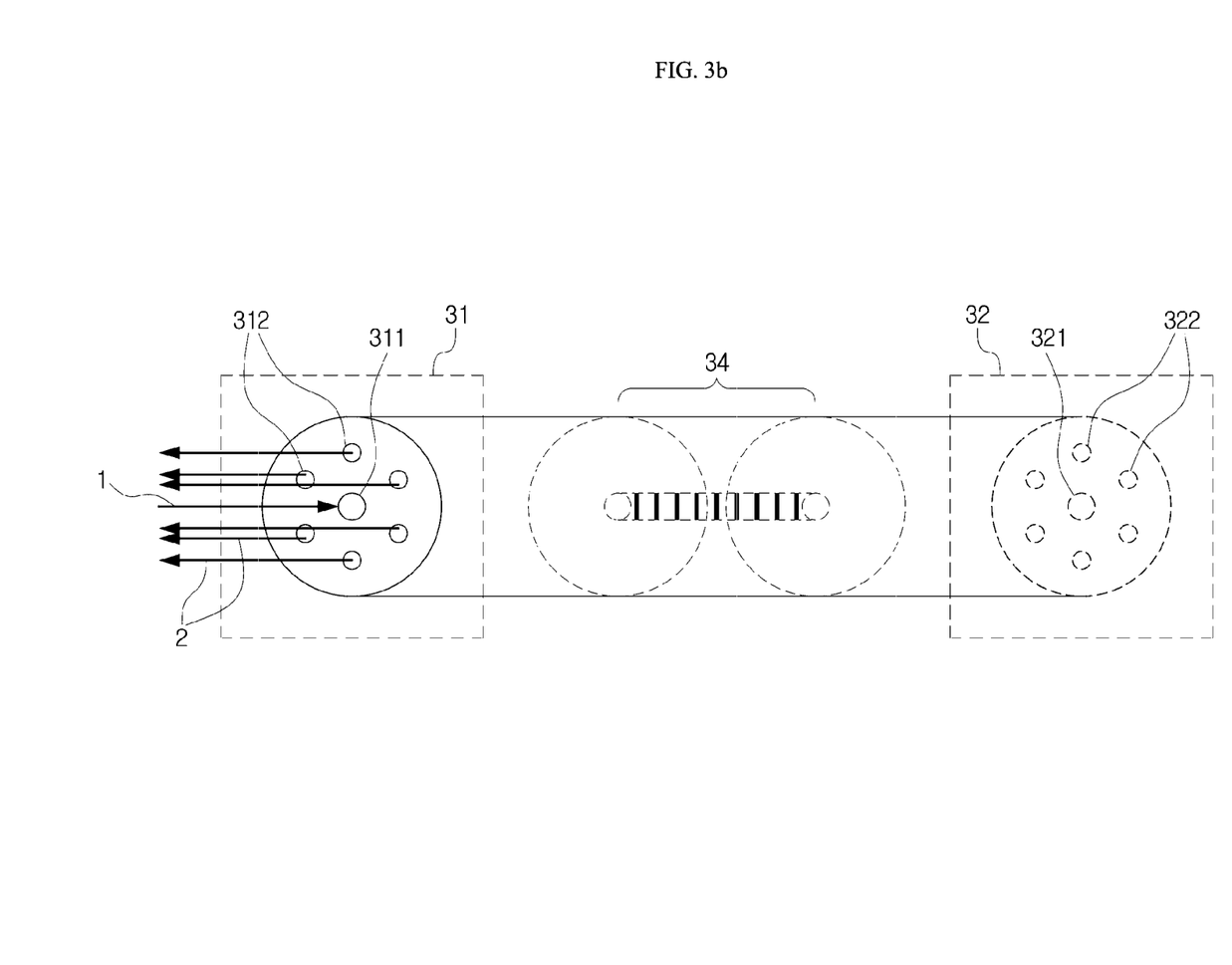

FIG. 3b is a schematic view showing an optical element according to another embodiment. The optical element shown in FIG. 3b includes the multicore optical fiber described above with reference to FIG. 2b and further includes an optical fiber grating 34 formed at an inner core of the multicore optical fiber. In this embodiment, the optical fiber grating 34 may be a short period grating (SPG).

Among optical signals 1 incident to the inner core 311 through the input end 31 of the multicore optical fiber, the optical signal of a resonance wavelength determined by Equation 1 may be coupled with the peripheral core 312 from the core 311 in a region where the optical fiber grating 34 is located. At this time, since the optical fiber grating 34 is not a long period grating but a short period grating, the light coupled with the peripheral core 312 may be coupled in a reverse direction. The output light 2 may be output through the coupled peripheral core 32 of the input end 31. Therefore, in this case, light may not be output through the output end 32 of the multicore optical fiber.

The optical fiber grating 33, 34 as shown in FIG. 3a or FIG. 3b may be formed by using a known method. For example, the short period grating 34 may be formed by using a method using a phase mask or a laser interferometer, or the like, and the long period grating 33 may be formed by using a method using a scattering mask or an amplitude mask, or the like. The optical fiber grating 33, 34 may be selectively formed only at a desired core of the multicore optical fiber (for example, the inner core). For this, the core at which the optical fiber grating 33, 34 is to be formed may have relatively higher photosensitivity in comparison to other cores. For example, the core at which the optical fiber grating 33, 34 is to be formed may have a higher content of germanium (Ge) in comparison to other cores.

However, this is just an example, and the optical fiber grating 33, 34 may also be formed at the multicore optical fiber by using various other methods not disclosed herein, without being limited to a specific method.

Figure 4A:
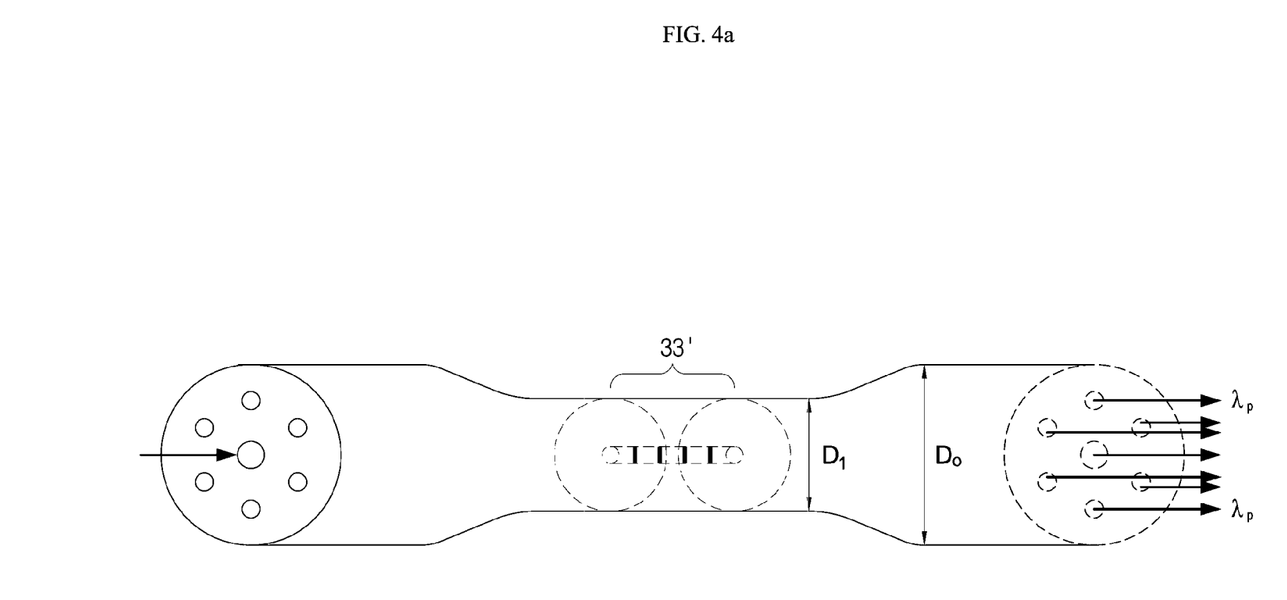
FIGS. 4a and 4b are schematic views showing optical elements according to other embodiments.

FIG. 4a is a schematic view showing an optical element according to another embodiment. The optical element shown in FIG. 4a has a configuration similar to the optical element depicted in FIG. 3a, except that a region of the multicore optical fiber at which an optical fiber grating 33' is located is tapered. In other words, the diameter $D_1$ of the region of the multicore optical fiber at which the optical fiber grating 33' is located may be smaller than the diameter $D_0$ of other regions. The partial region of the optical fiber may be tapered by using a known method. For example, first a tapered region is formed at the optical fiber by melting, and then, the optical fiber grating 33' may be fabricated at the tapered region.

Figure 4B:
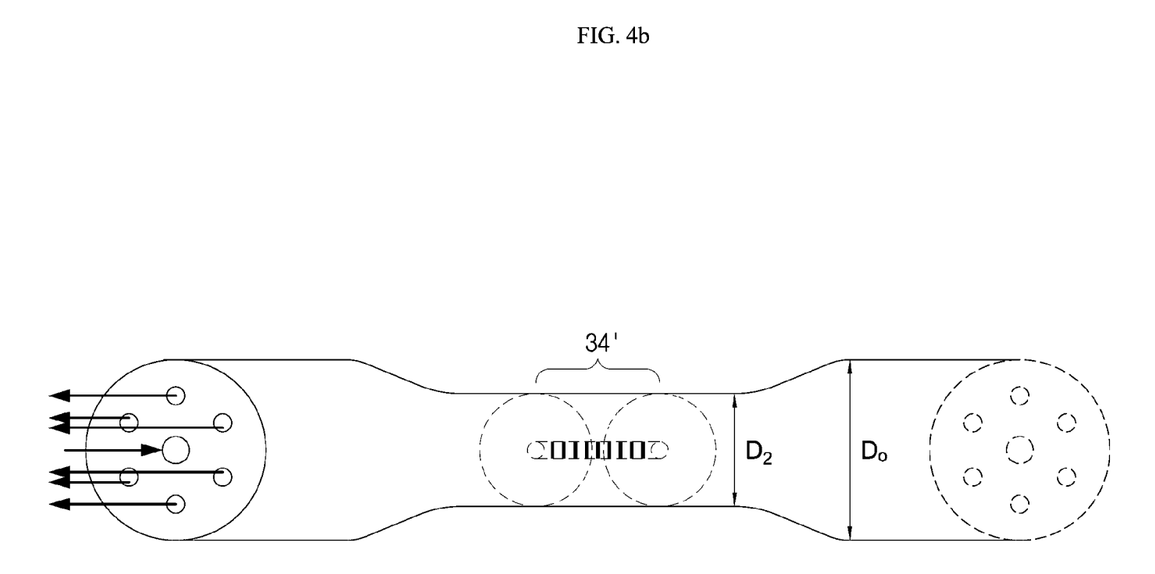

Similarly, the optical element shown in FIG. 4b has a configuration similar to the optical element depicted in FIG. 3b, except that a region of the multicore optical fiber at which an optical fiber grating 34' is located is tapered. In other words, the diameter $D_1$ of the region of the multicore optical fiber at which the optical fiber grating 34' is located may be smaller than the diameter $D_0$ of other regions.

Figure 5A:
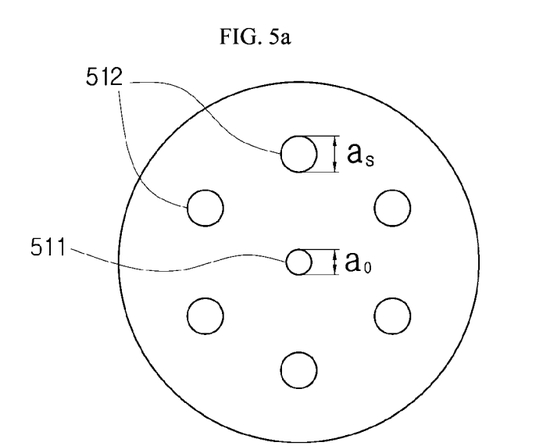
FIGS. 5a to 5c are cross-sectional views showing multicore optical fibers used for the optical elements according to embodiments.
Figure 5B:
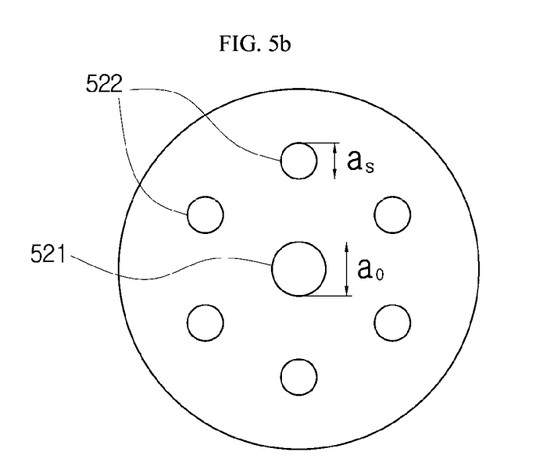
Figure 5C:
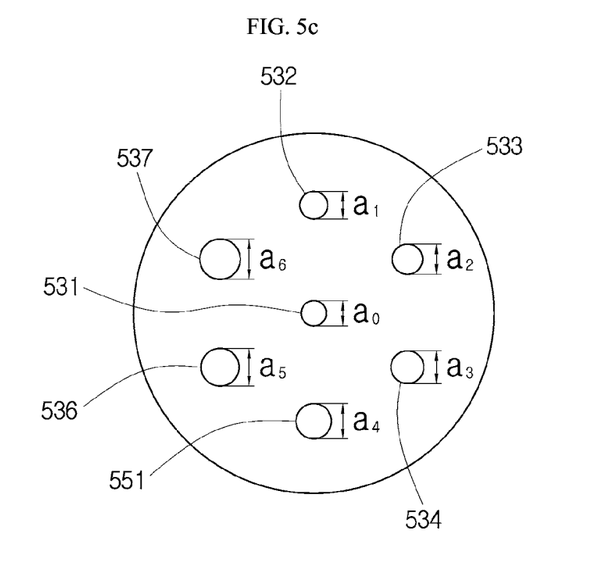

FIGS. 5a to 5c are cross-sectional views showing the multicore optical fibers used for optical elements according to embodiments. FIGS. 5a to 5c show multicore optical fibers in which the diameter of an inner core is different from the diameter of peripheral cores.

As shown in FIG. 5a, in the multicore optical fiber, the diameter $a_0$ of an inner core 511 may be smaller than the diameter $a_s$ of a peripheral core 512. Alternatively, as shown in FIG. 5b, in the multicore optical fiber, the diameter $a_0$ of an inner core 521 may be greater than the diameter $a_s$ of a peripheral core 522. In FIGS. 5a and 5b, at least one peripheral core 512 may have the same diameter $a_s$. Meanwhile, as shown in FIG. 5c, the diameter $a_0$ of an inner core 531 may be different from the diameter of each peripheral core 532, 533, 534, 535, 536, 537, and at least one peripheral core 532, 533, 534, 535, 536, 537 may also have different diameters $a_1$, $a_2$, $a_3$, $a_4$, $a_5$, $a_6$ from each other.

Figure 6:
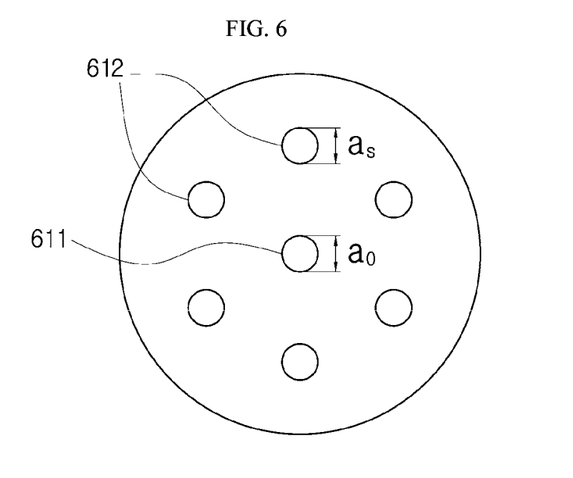
FIG. 6 is a cross-sectional view showing a multicore optical fiber used for the optical element according to another embodiment.

FIG. 6 is a cross-sectional view showing a section of a multicore optical fiber used for an optical element according to another embodiment. FIG. 6 shows a multicore optical fiber in which the refractive index, not a diameter, of an inner core 611 is different from that of peripheral cores 612. Therefore, in this case, the diameter $a_0$ of the inner core 611 may be equal to the diameter $a_s$ of the peripheral cores 612. However, the sectional shapes of the multicore optical fiber described above with reference to FIGS. 5 and 6 are just examples, and both diameter and refractive index of the inner core of a multicore optical fiber may be different from the diameter and refractive index of at least one peripheral core in another embodiment.

In the optical element according to the embodiments, an effective refractive index of the inner core or the peripheral core may be expressed using a parameter V calculated by Equation 2 below.

$$V = 2\pi r \sqrt{n_{core}^2 - n_{clad}^2}/\lambda \qquad \text{Equation 2}$$

In Equation 2, r represents a diameter of a target core (namely, an inner core or a peripheral core), $n_{core}$ represents a refractive index of the target core, $n_{clad}$ represents a refractive index of a cladding surrounding the target core, and λ represents a working wavelength.

According to the V-parameter of Equation 2, the multicore optical fibers depicted in FIGS. 5a and 5b correspond to the case in which a V-parameter value of the inner core 511, 512 is made different from a V-parameter value of the peripheral core 521, 522 by using the difference in diameter while six peripheral cores 521, 522 have the same V-parameter value. Meanwhile, the multicore optical fiber shown in FIG. 5c corresponds to the case in which the inner core 531 and six peripheral cores 532, 533, 534, 535, 536, 537 have different V-parameter values from each other.

In another case, as shown in FIG. 6, the inner core 611 and the peripheral cores 612 may have the same diameter but have different refractive indexes or different refractive index distributions. By doing so, the peripheral cores 612 may have V-parameter values different from that of the inner core 611 but six peripheral cores 612 have the same V-parameter values, or the inner core 611 and six peripheral cores 612 may have different V-parameter values from each other.

Figure 7A:
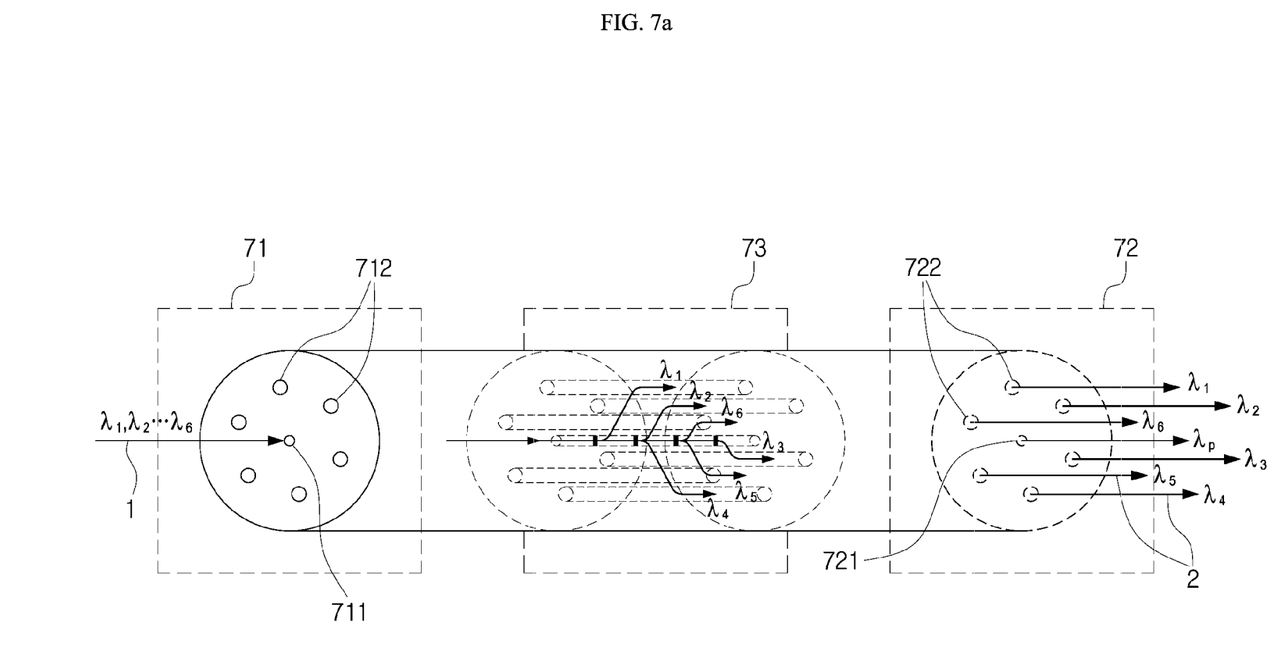
FIGS. 7a and 7b are schematic views showing an optical fiber wavelength multiplexer/demultiplexer using the optical element according to the embodiments.

FIG. 7a is a schematic view showing an optical fiber wavelength multiplexer/demultiplexer using the optical element according to the embodiment.

In an input end 71 of FIG. 7a, the optical fiber wavelength multiplexer/demultiplexer includes an inner core 711 and peripheral cores 712, in which the inner core 711 may have a smaller diameter than the peripheral cores 712. However, this is just an example, and in other embodiments, the inner core 711 may have a greater diameter than the peripheral cores 712, or the inner core 711 may have the same diameter as the peripheral cores 712 but have a refractive index or refractive index distribution different from the peripheral cores 712. The inner core 711 and at least one peripheral core 712 of the input end 71 may respectively correspond to an inner core 721 and at least one peripheral core 722 of an output end 72.

Incident light 1 having at least one wavelength $\lambda_1$, $\lambda_2$, $\lambda_3$, $\lambda_4$, $\lambda_5$, $\lambda_6$ different from each other may be incident to the inner core 711 of the input end 71. In the incident light 1, a light of each wavelength $\lambda_1$, $\lambda_2$, $\lambda_3$, $\lambda_4$, $\lambda_5$, $\lambda_6$ may be coupled with a neighboring peripheral core 712 due to an optical fiber grating 73 formed at the inner core 711. For example, the optical fiber grating 73 may be a long period grating (LPG). Due to the optical fiber grating 73, the light of at least one wavelength $\lambda_1, \lambda_2, \lambda_3, \lambda_4, \lambda_5, \lambda_6$ different from each other may be coupled with at least one peripheral core 712 in a forward direction.

Since the resonance wavelength at which optical coupling occurs is determined based on the effective refractive indexes (for example, the V-parameters) of the inner core 711 and the peripheral cores 712, at least one peripheral core 712 may have effective refractive indexes different from each other so that lights having different wavelengths $\lambda_1, \lambda_2, \lambda_3, \lambda_4, \lambda_5, \lambda_6$ may be coupled from the inner core 711. For example, at least one peripheral core 712 may have diameters and/or refractive indexes different from each other. The light coupled with the peripheral core 712 may be output in the form of the output light 2 through the peripheral core 722 of the output end 72.

FIG. 7a shows an optical fiber wavelength demultiplexer to which the incident light 1 having a plurality of wavelengths $\lambda_1, \lambda_2, \lambda_3, \lambda_4, \lambda_5, \lambda_6$ is incident through the inner core 711 of the input end 71 and from which the incident light 1 is divided based on wavelengths and output through at least one peripheral core 722 of the output end 72. However, the optical fiber wavelength multiplexer may also be configured using the optical element shown in FIG. 7a by switching the input portion and the output portion. In other words, incident lights having wavelengths $\lambda_1, \lambda_2, \lambda_3, \lambda_4, \lambda_5, \lambda_6$ may be input through at least one peripheral core 722 of the output end 72, and the input incident lights may be coupled with the inner core 721 from the peripheral cores 722 due to the optical fiber grating 73, so that the incident lights become output light having a plurality of wavelengths $\lambda_1, \lambda_2, \lambda_3, \lambda_4, \lambda_5, \lambda_6$ and output through the inner core 711 of the input end 71. Therefore, wavelengths may be multiplexed and/or demultiplexed by using the optical element according to the embodiments.

Figure 7B:
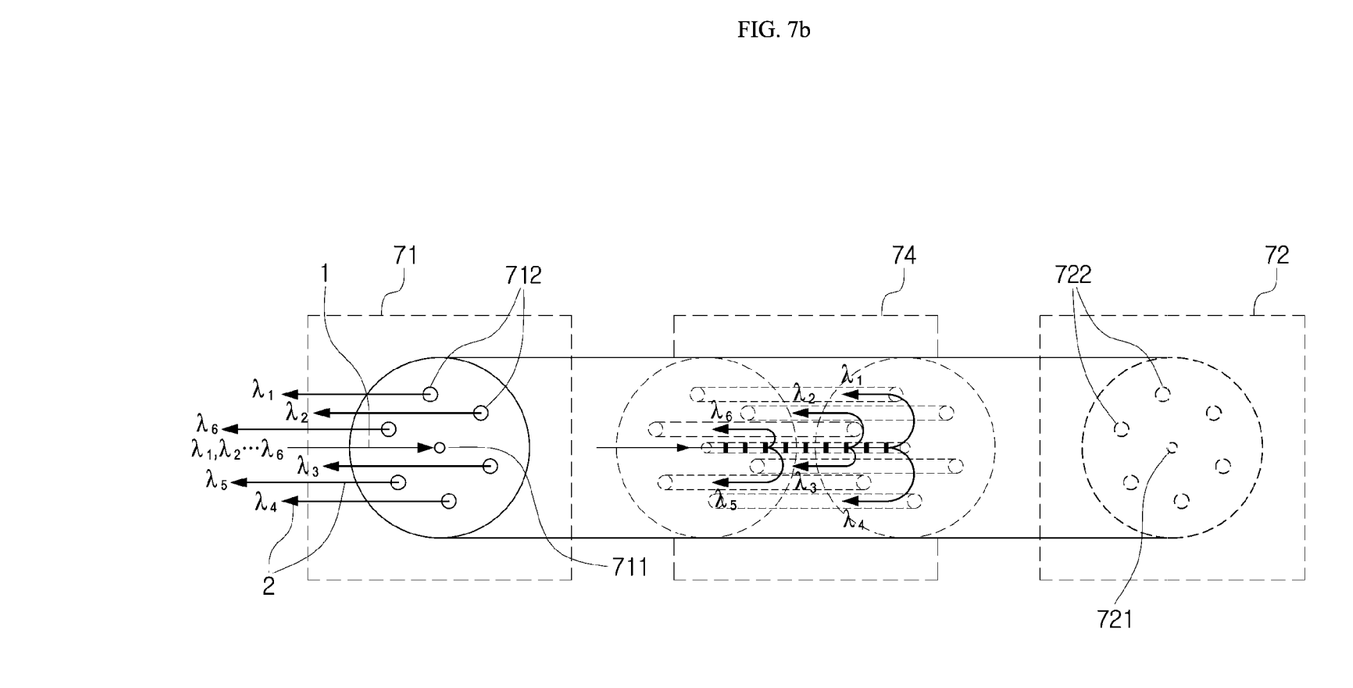

FIG. 7b is a schematic view showing an optical fiber wavelength multiplexer/demultiplexer using the optical element according to another embodiment. The optical fiber wavelength multiplexer/demultiplexer shown in FIG. 7b is substantially identical to the optical fiber wavelength multiplexer/demultiplexer of FIG. 7a, except that a short period grating 74 is included instead of a long period grating, and is therefore not described in detail here.

Figure 8A:
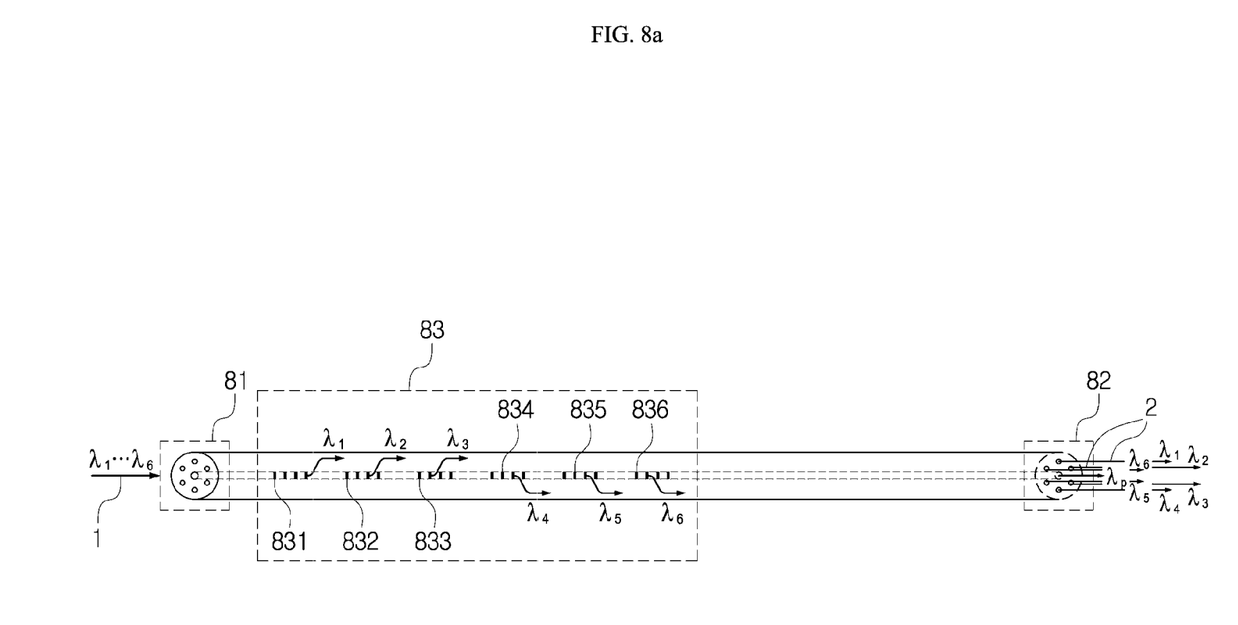
FIGS. 8a and 8b are schematic views showing a tandem-type wavelength multiplexer/demultiplexer using the optical element according to the embodiments.

FIG. 8a is a schematic view showing a tandem-type wavelength multiplexer/demultiplexer using the optical element according to an embodiment.

The tandem-type wavelength multiplexer/demultiplexer shown in FIG. 8a has a configuration similar to the optical fiber wavelength multiplexer/demultiplexer of FIG. 7a, except that the optical fiber grating 83 formed at the multicore optical fiber includes at least one optical fiber grating 831, 832, 833, 834, 835, 836. The at least one optical fiber grating 831, 832, 833, 834, 835, 836 may be respectively a long period grating. At least one optical fiber grating 831, 832, 833, 834, 835, 836 is arranged along the longitudinal direction of the multicore optical fiber and configured to couple lights of different wavelengths with the peripheral cores from the inner core. For example, at least one optical fiber grating 831, 832, 833, 834, 835, 836 may have periods different from each other.

In the demultiplexing operation, for example, among optical signals 1 incident to an input end 81, an optical signal of a first wavelength $\lambda_1$ determined based on a period of an optical fiber grating 831 may be coupled with a peripheral core from the inner core at a region where the optical fiber grating 831 is located. Meanwhile, in an embodiment, at least one optical fiber grating 831, 832, 833, 834, 835, 836 have periods different from each other. As a result, while the incident optical signals 1 are passing through the optical fiber gratings 831, 832, 833, 834, 835, 836, lights of wavelengths $\lambda_1, \lambda_2, \lambda_3, \lambda_4, \lambda_5, \lambda_6$ different from each other may be coupled with peripheral cores from the inner core. Due to this configuration, at an output end 82, optical signals 2 having at least one wavelength $\lambda_1, \lambda_2, \lambda_3, \lambda_4, \lambda_5, \lambda_6$ different from each other are output through at least one peripheral core, thereby performing the wavelength demultiplexing operation.

Figure 8B:
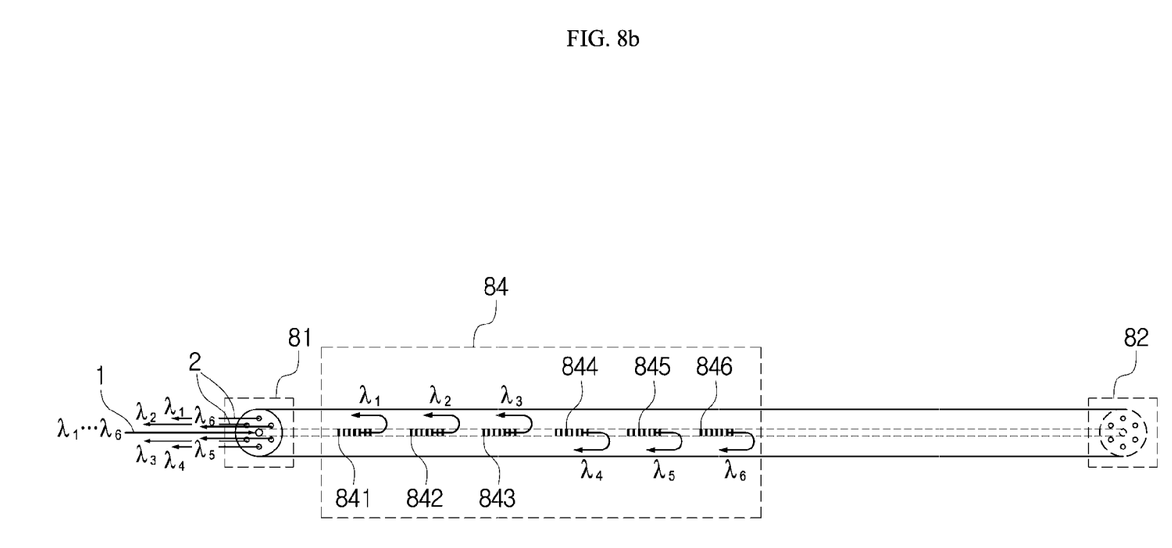

FIG. 8b is a schematic view showing a tandem-type wavelength multiplexer/demultiplexer using the optical element according to another embodiment. The tandem-type wavelength multiplexer/demultiplexer shown in FIG. 8b has the same configuration as the tandem-type wavelength multiplexer/demultiplexer of FIG. 8a, except that at least one optical fiber grating 841, 842, 843, 844, 845, 846 is respectively a short period grating, and is therefore not described in detail here.

The optical element according to the present disclosure may be used to drop or add an optical signal of a specific wavelength channel by forming an optical fiber grating at a multicore optical fiber. Since the optical element may be fabricated easily, designed in a small size and mass-produced reproducibly at low costs, the optical element may be advantageously utilized for an optical communication network such as a wavelength division multiplexing network, an ultra-high speed optical communication system, an optical sensor system or the like.

While the present disclosure has been described with reference to embodiments depicted in the drawings, it is just an example and it will be understood by those skilled in the art that various changes or modifications may be made thereto. However, such modifications should be regarded as belonging to the technical scope of the present disclosure. Therefore, the true scope of the present disclosure should be decided based on the technical spirit of the appended claims.

What is claimed is:

1. An optical element, comprising:
   a multicore optical fiber including an inner core and a plurality of peripheral cores arranged around the inner core, each having an effective refractive index different from that of the inner core; and
   an optical fiber grating formed at the multicore optical fiber to cause a plurality of optical signals to be coupled between the inner core and respective peripheral cores, wherein the optical fiber grating is formed only at the inner core of the multicore optical fiber and is configured to couple a light having a resonance wavelength, among the optical signal propagated through the inner core, with at least one of the peripheral cores, wherein a diameter of the inner core is greater than each diameter of the peripheral cores, and wherein a region of the multicore optical fiber at which the optical fiber grating is located has a smaller diameter in comparison to other regions of the multicore optical fiber.

2. The optical element according to claim 1, wherein a refractive index of each peripheral core is identical to a refractive index of the inner core.

3. The optical element according to claim 2, wherein at least one of the peripheral cores has a different diameter from the other peripheral core(s).

4. The optical element according to claim 1, wherein at least one of the peripheral cores has a different refractive index from the other peripheral core(s).

5. The optical element according to claim 1, wherein the optical fiber grating comprises at least one optical fiber grating arranged along a longitudinal direction of the multicore optical fiber.

6. The optical element according to claim 5, comprising a plurality of optical fiber gratings having different periods from each other.

7. The optical element according to claim 1, wherein the resonance wavelength is determined based on each effective refractive index of the different cores and a period of the optical fiber grating.

8. The optical element according to claim 1, wherein the optical fiber grating comprises a reflection-type optical fiber grating or a transmission-type optical fiber grating.

9. A method for processing an optical signal, comprising:
inputting a plurality of optical signals to a multicore optical fiber including an inner core and a plurality of peripheral cores arranged around the inner core and each having an effective refractive index different from that of the inner core; and
coupling the optical signals between the inner core and respective peripheral cores by means of an optical fiber grating formed at the multicore optical fiber,
wherein the optical fiber grating is formed only at the inner core of the multicore optical fiber,
wherein said coupling of the optical signals comprises coupling a light having a resonance wavelength, among the optical signal propagated through the inner core, with at least one of the peripheral cores,
wherein a diameter of the inner core is greater than each diameter of the peripheral cores, and wherein a region of the multicore optical fiber at which the optical fiber grating is located has a smaller diameter in comparison to other regions of the multicore optical fiber.

10. The method according to claim 9, wherein the resonance wavelength is determined based on each effective refractive index of the different cores and a period of the optical fiber grating.

11. The method according to claim 9, wherein the optical signals comprise at least one light having different wavelengths from each other, wherein the optical fiber grating comprises at least one optical fiber grating arranged along a longitudinal direction of the multicore optical fiber, and wherein said coupling of the optical signals comprise coupling the at least one light having different wavelengths from each other by means of the at least one optical fiber grating.

12. The method according to claim 9, further comprising outputting the coupled optical signals from the multicore optical fiber.

* * * * *